United States Patent [19]

Inoue

[11] Patent Number: 4,622,449
[45] Date of Patent: Nov. 11, 1986

[54] USING THE WEIGHT OF THE ELECTRODE OR WORKPIECE TO CONTROL EDM WORKING CONDITIONS

[75] Inventor: Kiyoshi Inoue, Tokyo, Japan

[73] Assignee: Inoue-Japax Research Incorporated, Yokohamashi, Japan

[21] Appl. No.: 488,679

[22] Filed: Apr. 26, 1983

[30] Foreign Application Priority Data

Apr. 28, 1982 [JP] Japan ................................. 57-70265

[51] Int. Cl.⁴ ............................................ B23H 7/00
[52] U.S. Cl. ........................... 219/69 R; 51/165.77; 51/165.87; 204/129.25; 204/224 M; 219/69 M
[58] Field of Search ............... 219/69 R, 69 M, 69 G, 219/68, 69 V, 69 S, 69 C; 204/129.1, 129.2, 129.25, 129.5, 224 M, 225; 177/207, 245; 51/165.77, 165.87, 165.72, 165.71, 165.74

[56] References Cited

U.S. PATENT DOCUMENTS

| | | | |
|---|---|---|---|
| 240,678 | 4/1881 | Edison | 177/46 |
| 1,524,928 | 2/1925 | Hardel et al. | 177/207 |
| 2,467,161 | 4/1949 | Sheeley | 51/165.77 |
| 2,634,120 | 4/1953 | Ouaida | 177/207 |
| 2,706,755 | 4/1955 | Krasno | 177/245 |
| 2,962,938 | 12/1960 | Buigne | 177/245 |
| 2,996,601 | 8/1961 | Sweetman | 219/69 V |
| 3,506,559 | 4/1970 | Bonga | 204/225 |
| 3,590,210 | 6/1971 | O'Connor | 219/69 G |
| 3,591,761 | 7/1971 | Bederman | 219/69 V |
| 3,809,848 | 5/1974 | Bell, Jr. | 219/69 C |
| 3,932,053 | 1/1976 | Hack | 29/558 |
| 4,014,142 | 3/1977 | Coes, Jr. | 51/165.92 |
| 4,193,227 | 3/1980 | Uhtenwoldt | 51/165.77 |
| 4,307,279 | 12/1981 | Inoue et al. | 219/69 W |
| 4,316,071 | 2/1982 | Bonga | 219/69 E |
| 4,370,835 | 2/1983 | von Schneidemesser et al. | 51/165.77 |
| 4,409,457 | 10/1983 | Takahashi et al. | 219/69 E |
| 4,459,783 | 7/1984 | Odell, II et al. | 177/245 |

FOREIGN PATENT DOCUMENTS

| | | | |
|---|---|---|---|
| 52-53599 | 4/1977 | Japan | 219/69 C |
| 56-21735A | 2/1981 | Japan | 219/69 E |

Primary Examiner—A. D. Pellinen
Assistant Examiner—Geoffrey S. Evans
Attorney, Agent, or Firm—Roberts, Spiecens & Cohen

[57] ABSTRACT

An electrical discharge machine is provided with at least one weight measuring apparatus for detecting the weight of one or both of an electrode and a workpiece, and a control unit for selecting or controlling the working conditions in response to the output of the weight measuring apparatus. The weights of the electrode and the workpiece are measured after the working operation has been interrupted temporarily, or while continuing the working operation. Well-known various accurate balances or force measuring apparatuses may be used as the weight measuring apparatus. A microcomputer including a numerical control unit may be used as the control unit.

19 Claims, 4 Drawing Figures

USING THE WEIGHT OF THE ELECTRODE OR WORKPIECE TO CONTROL EDM WORKING CONDITIONS

FIELD OF THE INVENTION

This invention relates to an electrical discharge machine, and more particularly, to an electrical discharge machine in which the work conditions can be properly controlled in response to the progress of work or a workpiece and to the magnitude of electrode wear.

BACKGROUND OF THE INVENTION

In a conventional electrical discharge machine, a working electrode and a workpiece are spaced at a predetermined gap and a pulse-like voltage is applied between the electrode and the workpiece while supplying a working fluid in the gap, thereby causing an electrical discharge to perform the spark erosion.

In such well-known conventional electrical discharge machine, in order to prevent a short circuit and an abnormal arc discharge or the like from occurring between the electrode and the workpiece during the working operation, a servo motion of the workpiece and the electrode is additionally performed to automatically adjust the width of the working gap in response to pollution of the working fluid in the working gap and to a change in a discharge current or the like, in addition to the relative work-movement between the workpiece and the electrode. However, when the working speed (g/min) substantially drops or the electrode is excessively worn, the conventional electrical discharge machine described above cannot cope with these conditions. Thus, there are problems in that the working operation stops and sufficient work accuracy cannot be obtained. Effective means for eliminating such problems has not yet been proposed.

SUMMARY OF THE INVENTION

This invention seeks to overcome the above-described problems. It is therefore an object of the present invention to provide an electrical discharge machine in which the working conditions are appropriately controlled in response to the progress of work on a workpiece and to the magnitude of electrode wear, thereby performing a smooth and high-accurate working operation.

According to the present invention, in order to accomplish the above-mentioned object, the electrical discharge machine automatically measures the weight(s) of the electrode and/or the workpiece at any time or in proper time periods using a high-accurate weight measuring apparatus; calculates the difference between the actual weight on the basis of its measured value and a predetermined weight, and the quantity of electrode wear or the like using a microcomputer; and suitably selects, changes, or controls the working conditions in accordance with the calculated data, thereby maintaining the optimum working conditions.

The weight of the workpiece is measured together with a work tank after the working fluid has been drained, thereby interrupting the working operation temporarily. Otherwise, only the weight of the workpiece is measured with the workpiece immersed in the working fluid. The weight of the electrode is obtained by measuring the electrode which was automatically removed after interrupting the working operation temporarily. Or else, it is measured with the electrode attached at the work location in the working fluid.

Other objects, features and advantages of the invention will become apparent from the following description of embodiments while referring to the accompanying drawings, which show the details essential to the invention.

DETAILED DESCRIPTION OF THE PREFERRED EMBODIMENTS

Figure 1:
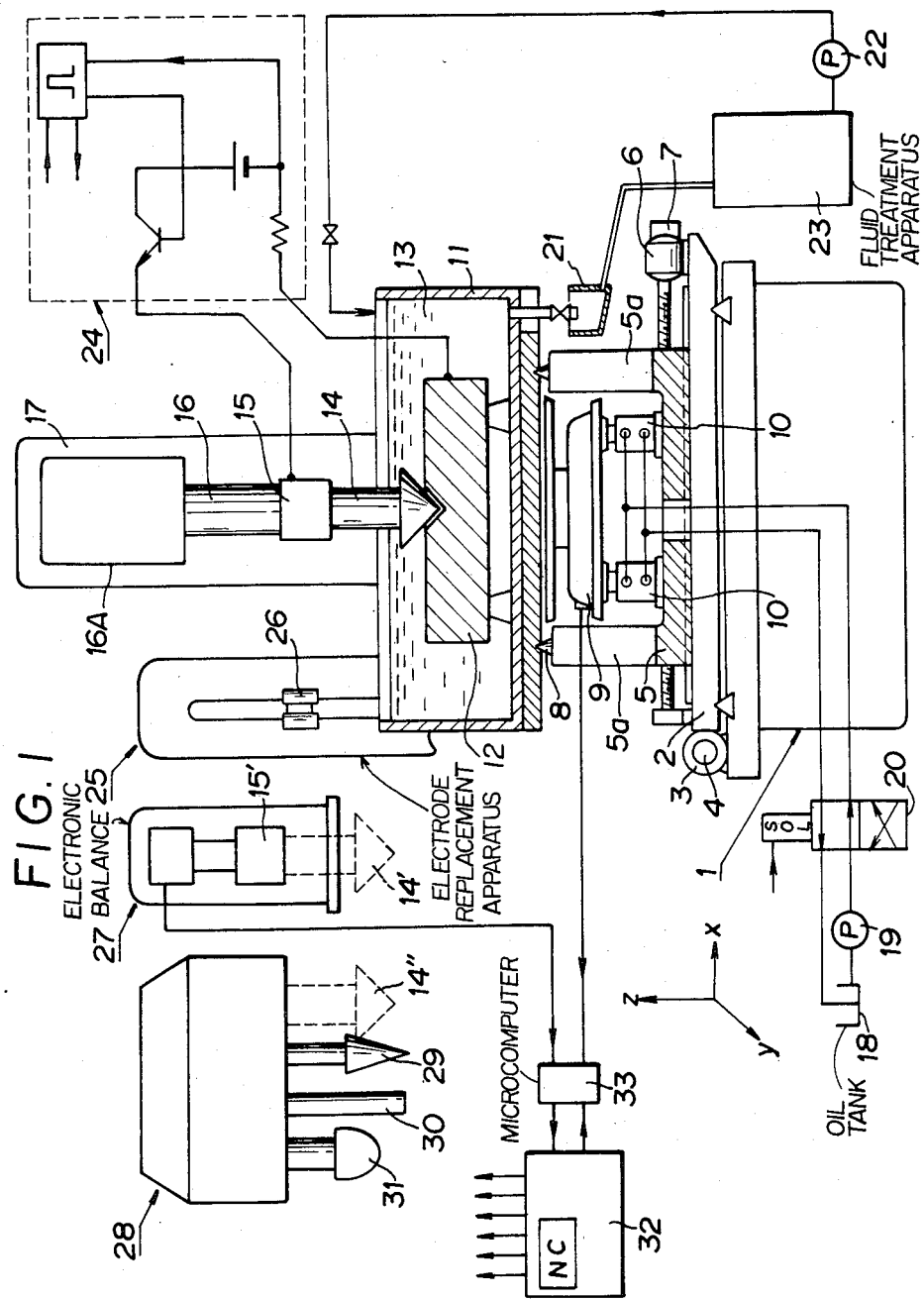
FIG. 1 is a schematic drawing illustrating an embodiment of an electrical discharge machine according to the present invention.

In FIGS. 1 to 4, the same elements and components having the same or similar functions are designated by the same reference numerals.

In FIG. 1, reference numeral 1 indicates a main body of an electrical discharge machine; 2 denotes a work table movable in the direction of the Y-axis; 3 shows a motor for moving the table 2; 4 is an encoder; 5 is a work table movable in the direction of the X-axis; 6 is a motor for moving the table 5; 7 is an encoder; 8 is a conical guide; 9 is an electronic balance with large capacity and high accuracy; 10 are hydraulic jacks; 11 is a work tank; 12 is a workpiece; 13 is a working fluid; 14 is an electrode; 15 is a chuck for holding the electrode 14; 16 is a stem, 16A is a servo-control system for moving the electrode 14 in the direction of the Z-axis; 17 is a column; 18 is an oil tank for supplying working oil to the hydraulic jacks 10; 19 is an oil pump; 20 is a four-way valve; 21 is a service tank; 22 is a pump; 23 is a working fluid treating apparatus for performing filtration of the working fluid and adjustment of the concentration; 24 is a power circuit for spark erosion; 25 is an automatic electrode exchanging apparatus; 26 is a swing arm for exchanging the electrode; 27 is an electronic balance for measuring the weight of the electrode; 28 is an electrode magazine; 29, 30 and 31 are electrodes with different tip shapes; 32 is a control unit including a numerical control unit (hereinafter, referred to as an NC); and 33 is a micro-computer.

The control unit 32 including the NC serves to control integrally the entire working processes, namely, the positioning along the X-, Y-, and Z axes, working motion, vertical reciprocation of the electrode, exchange of the electrode, power supply for work, or the like.

Four columns 5a are mounted at the four corners of the work table 5, and the conical guides 8 are mounted on each pole in order to position the work tank 11. The work tank 11 is mounted on the columns 5a so that it engages the conical guides 8. The workpiece 12 is attached within the work tank 11 and is immersed in the working fluid 13. The working fluid 13 is drained from the work tank 11 if necessary, and recycled into the work tank 11 through the service tank 21, working fluid treating apparatus 23 and pump 22.

The electronic balance 9 of large capacity has a high accuracy of, for example, one to 100 thousandths (1/100,000) or better, and is mounted on the hydraulic jacks 10 on the work moving table 5. With such a construction, when the working oil in the oil tank 18 is supplied to the hydraulic jacks 10 through the four-way valve 20 by means of the oil pump 19, the electronic balance 9 moves vertically. When it moves upward, the work tank 11 is removed from the columns 5a and is supported by the balance 9, thereby measuring the weight of the work tank 11 and the workpiece 12. This measuring operation is performed in accordance with the program of the control unit 32.

Upon measuring, the working fluid 13 in the work tank 11 is entirely drained and the inside of the work tank is completely cleaned by clean working fluid from a working fluid jet nozzle (not shown).

The swing arm 26 of the automatic electrode exchanging apparatus 25 sequentially takes out a predetermined electrode 14 from the electrode magazine 28 in response to a command from the control unit 32. After the weight of the electrode 14 has been measured by the electronic balance 27, the arm 26 attaches the electrode 14 to the electrode chuck 15. When a predetermined work operation has been completed, arm 26 detaches the electrode 14 from the electrode chuck 15 and after the weight of the electrode 14 has been measured by the electronic balance 27, the swing arm 26 returns the electrode 14 to the electrode magazine 28. Thereafter, the swing arm 26 selects the electrode necessary for the next work operation from the electrodes 29, 30, 31, or the like, and after measuring the weight thereof, attaches it to the electrode chuck 15.

The electronic balance 27 for measuring the weight of the electrode is attached to the main body 1 of the electrical discharge machine or to the electrode magazine 28. Upon measuring the weight of the electrode, it is preferable to hold the electrode by an electrode chuck 15' which is similar to the electrode chuck 15.

In FIG. 1, reference numerals 14' and 14" denote the electrode 14 in the course of its being measured and stored in the electrode magazine 28, respectively.

It may be possible to attach the electrode holders to the electrodes 14, 29, 30 and 31 to hold them respectively, thereby exchanging the holder with the electrode and measuring the weight thereof.

Both the values measured by the electronic balances 9 and 27, or the value of either of them is fed to microcomputer 33, and the quantity of work, quantity of electrode wear, electrode wear ratio, or the like are calculated on the basis of these measured values, then they are compared with a predetermined weight. Thus, the microcomputer 33 and the control unit 32 including the NC appropriately select, change, or control the working conditions in accordance with these data to permit the shift to the next working step and to optimize the working conditions, thereby maintaining the desired working speed and accuracy.

In the above-described embodiment, upon measuring the weight of the workpiece 12, the working fluid 13 in the work tank 11 is drained and extraneous articles produced by the spark erosion are washed away from the workpiece and the internal surfaces of the work tank, whereafter the weight of the workpiece together with the work tank is measured. It may be possible, however, to measure the weight of the workpiece with the working fluid filled in the work tank.

Figure 2:
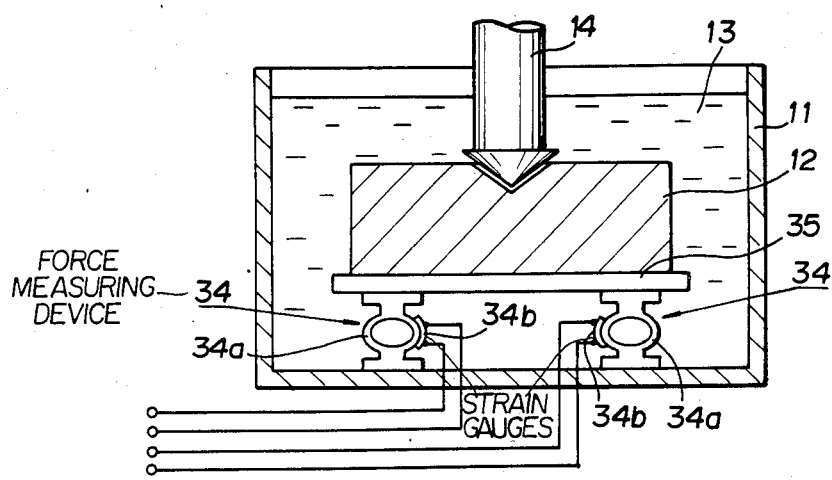
FIG. 2 is a schematic drawing illustrating an embodiment of a weight measuring apparatus which can detect the weight of a workpiece immersed in the working fluid.

That is to say, as shown in FIG. 2 for example, force measuring devices 34 are attached to the bottom of the work tank 11, and the workpiece 12 is placed on a mounting table 35 attached on the force measuring apparatuses 34 and 34, thereby measuring the weight of the workpiece. Each force measuring device 34 consists of a loop-like main body 34a and a strain gauge 34b attached to the side thereof. The weight of the workpiece is measured by the strain gauge 34b which detects the deformation of the main body 34a caused by the weight of the workpiece 12. The detection by the force measuring apparatus 34 is carried out when the electrical discharge is stopped temporarily so that the pressure of the discharge does not affect the detection. The outputs of the strain gauges 34b are fed to the microcomputer 33 in the same way as shown in FIG. 1, thereby allowing the control unit 32 to control the working conditions thereafter on the basis of the operational result.

When the weight of the workpiece 12 changes during the working operation and, accordingly, when the deformation of the main body 34a of the force measuring device changes, the workpiece 12 itself is also deflected upwardly; however, this deflected amount is very small and can be easily calculated from the measured value by the strain gauge 34b, so that the working depth can be corrected by the compensating calculation.

Figure 3:
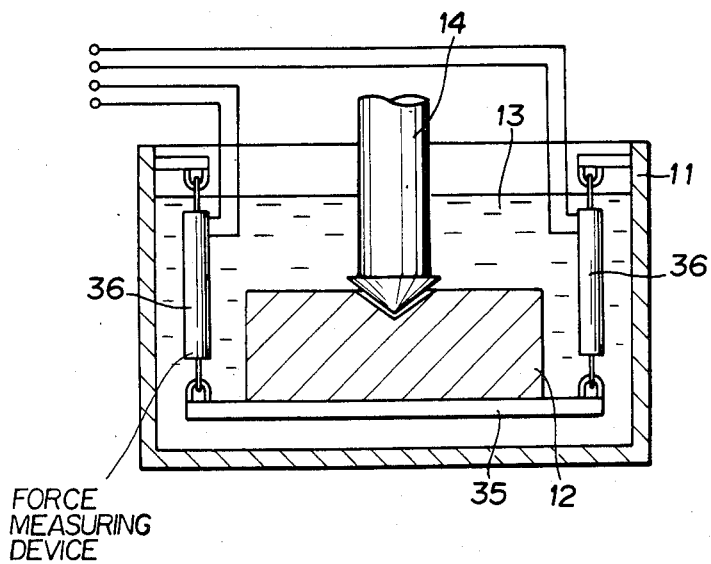
FIG. 3 is a schematic drawing illustrating another embodiment of the weight measuring apparatus which can detect the weight of a workpiece immersed in the working fluid.

Referring to a third embodiment shown in FIG. 3, the weight of the workpiece 12 can be measured with the working fluid filled in the work tank 11. The mounting table 35 is suspended in the work tank by suspension-type force measuring devices 36 for allowing the weight of the workpiece 12 mounted on the mounting table 35 to be measured by the suspension-type force measuring devices. The outputs of the suspension-type force measuring devices 36 are fed to the microcomputer 33 in the same way as the embodiment described previously, thereby allowing the control unit 32 to control the working conditions thereafter on the basis of the operational result.

In the first embodiment shown in FIG. 1, the weight of the electrode 14 is measured by removing the electrode from the chuck 15 and attaching to the electronic balance 27 for the electrode; however, it is also possible to measure the weight of the electrode while continuing the electrical discharge with the working fluid filled in the work tank.

Figure 4:
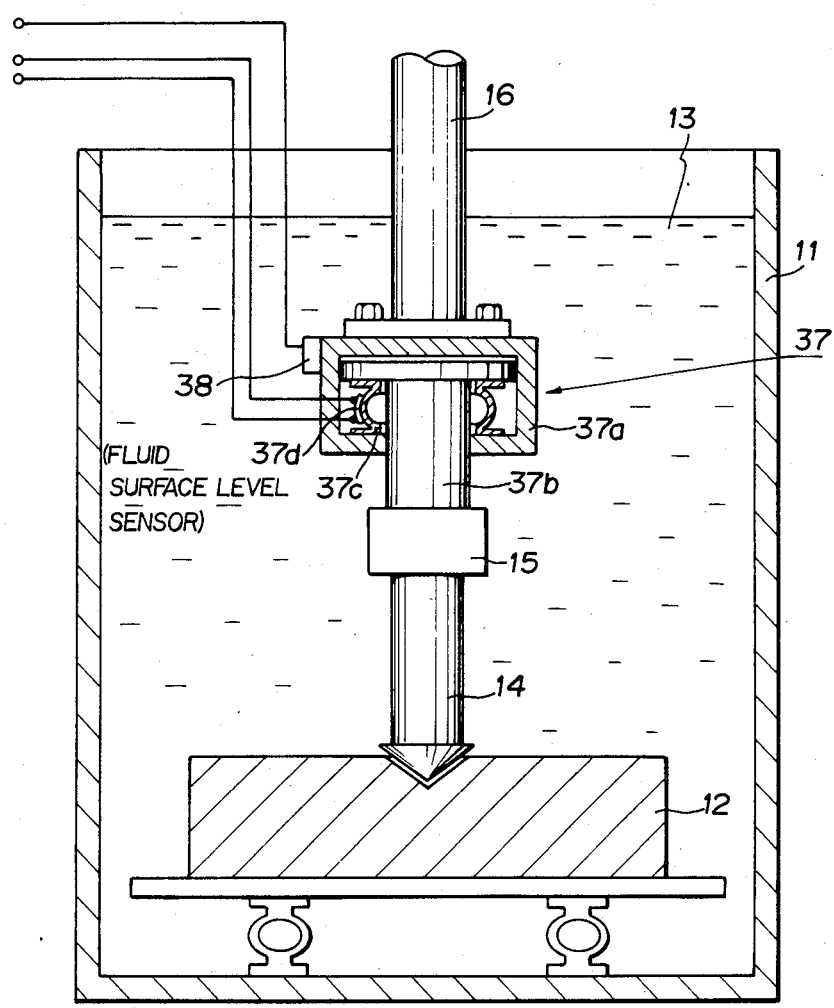
FIG. 4 is a schematic drawing illustrating an embodiment of the weight measuring apparatus which can detect the weight of the electrode without removing the electrode from its working location.

For example as shown in FIG. 4, a weight measuring apparatus 37 is attached to the bottom of the stem 16 and the electrode 14 is attached thereto. The weight measuring apparatus 37 consists of a casing 37a, a piston 37b which can slide vertically in the casing, an annular main body 37c of the force measuring apparatus having a curved side wall, and a strain gauge 37d attached to the side wall of the main body 37c. The chuck 15 is attached to the bottom of the piston 37b and the electrode 14 is attached thereto. The weight of the electrode 14 is transmitted to the main body 37c through the piston 37b causing the main body 37c to be deformed. Therefore, the weight of the electrode is measured by detecting this deformation using the strain gauge 37d. The detection is carried out when the working operation is stopped temporarily, for example, when the electrode is at the upper dead point in the reciprocation. The output of the strain gauge 37d is fed to the microcomputer 33 in the same way as was the output of the electronic balance 27 for measuring the weight of the electrode shown in FIG. 1, thereby allowing the control unit 32 to control the working conditions thereafter on the basis of the operational result. When the surface level of the working fluid 13 drops and, therefore, when the portions of the weight measuring apparatus 37 and the electrode 14 are exposed over the surface of the working fluid, the buoyancy applied to them will be lost partially, and this causes the calculation of the weight of the electrode to be more complicated. Therefore, it is desired to perform the measurement while the weight measuring apparatus 37 and the electrode 14 are always immersed in the working fluid. For this purpose, for example, a fluid surface level sensor 38 is preferably attached to the outer wall of the weight measuring apparatus 37 for permitting the working fluid to be add into the working tank in response to the output from this sensor 38 when the working fluid descends below a predetermined level. On the other hand, the measurement by the weight measuring apparatus 37 may be carried out when the stem 16 and electrode 14 are raised up completely from the working fluid 13 so that the buoyancy effect does not apply at all.

As shown in FIG. 2 or 3, the weight of the workpiece can be measured while the workpiece is immersed in the working fluid, and furthermore, as shown in FIG. 4, the weight of the electrode can be measured without removing the electrode. With such a construction, therefore, the weights of both the workpiece and the electrode can be measured while continuing the spark erosion and the working conditions can be controlled properly on the basis of these measured values, so that the electrical discharge machine is provided with excellent work efficiency.

The weight measuring devices for measuring the weights of the workpiece and the electrode are not limited to the electronic balance 9 and 27 shown in FIG. 1, the force measuring apparatus 34 shown in FIG. 2, the suspension-type force measuring apparatus 36 shown in FIG. 3 and the weight measuring apparatus 37 shown in FIG. 4. Other well-known balances and force measuring devices with high accuracy may be also used in the present invention. The principle of the present invention may be also applied to an electrolytic working machine.

The present invention is so constructed as described above; therefore, according to the present invention, an electrical discharge machine is provided in which the working conditions are properly selected and controlled on the basis of changes in the weights of the workpiece and the electrode to maintain better working conditions, thereby improving the working speed and accuracy.

With this detailed description of the specific apparatus used to illustrate the preferred embodiments of the present invention, it will be obvious to those skilled in the art that various modifications and variations can be made in the present methods and apparatus described herein without departing from the spirit and scope of the invention which is limited only by the appended claims.

What is claimed is:

1. In an electrical discharge machine, in which a working gap is formed between a working electrode and a conductive workpiece, a pulse discharge is generated in said working gap between said electrode and said workpiece while supplying a working fluid to said electrode and said workpiece, and said electrode and said workpiece are relatively moved while maintaining a proper width of said working gap, thereby performing spark erosion, the improvement comprising at least one weight measuring means mounted on the electrical discharge machine for measuring the weight of at least one of said electrode and said workpiece, means establishing working conditions for the spark erosion of said workpiece including means for relatively positioning the electrode and workpiece with respect to three mutually perpendicular axes, means for relatively moving the electrode and the workpiece, means for replacing the electrode, and power supply means for said electrode and said workpiece and control means for controlling said means which establishes said working conditions in response to the measured weight to optimize said working conditions for the continuation of spark erosion of said workpiece.

2. An electrical discharge machine as claimed in claim 1, wherein said electrode is disposed at a working location during spark erosion, said weight measuring means measures the weight of the electrode at the working location.

3. An electrical discharge machine as claimed in claim 1 comprising a work tank containing the electrode and the workpiece, said weight measuring means measuring the weight of said workpiece and work tank together.

4. An electrical discharge machine as claimed in claim 1 comprising a work tank containing a working fluid, said electrode and said workpiece being immersed in said fluid, said weight measuring means measuring the weight of said workpiece while immersed in the working fluid in said work tank.

5. An electrical discharge machine as claimed in claim 1 wherein said weight measuring means is operative in the course of the machining of the workpiece by spark erosion and provides output to said control means which controls the means which establishes the working conditions to obtain optimized working conditions during subsequent machining by spark erosion of the workpiece.

6. An electrical discharge machine as claimed in claim 1 wherein the weight measuring means is operative during spark erosion.

7. An electrical discharge machine comprising a work tank including means for supporting a conductive workpiece element within the tank, an electrode element supported to project within the tank, in an operative position, in facing relation with said workpiece element to form a gap therewith, means for supplying working fluid, means for establishing working conditions in said tank to produce spark erosion of said workpiece element including means for supplying electrical energy to said workpiece and electrode elements, means for providing relative movement between said electrode and workpiece elements, and weighing means mounted on the electrical discharge machine for weighing at least one of said elements in the course of machining of the workpiece element by spark erosion to control the working conditions in said tank and the continued spark erosion of said workpiece element.

8. An electrical discharge machine as claimed in claim 7, wherein said weighing means suspends said electrode element for measurement of the weight of the electrode element.

9. An electrical discharge machine as claimed in claim 7, wherein the weighing means includes a weight measurement device for supporting said tank to measure the weight of said tank and said workpiece element supported therein together.

10. An electrical discharge machine as claimed in claim 7, wherein the weighing means includes a weight measurement device located within said tank for measuring the weight of the workpiece element in said tank.

11. An electrical discharge machine as claimed in claim 10, wherein said weight measurement device is supported by said tank and in turn supports said workpiece element.

12. An electrical discharge machine as claimed in claim 7 wherein the weight measuring means is operative during spark erosion.

13. In a method of machining a conductive workpiece element by spark erosion with an electrode element across a gap between said workpiece element and electrode element at a working location, and wherein the gap is immersed in a working fluid in a tank and the workpiece and electrode elements undergo relative movement to effect a machining operation on the workpiece element, the machining operation being carried out at said working location under working conditions including relatively positioning the workpiece and electrode elements along three mutually perpendicular axes, supplying electrical power to the electrode element and workpiece element and replacing the electrode element when worn, the improvement comprising measuring the weight of at least one of said workpiece and electrode elements at said working location in the course of machining the workpiece element by spark erosion and controlling the working conditions of the succeeding machining operation after the weight measurement of said at least one of said elements in response to said weight measurement to optimize the overall machining operation.

14. A method as claimed in claim 13, wherein the weight measurement is effected on the electrode element with the latter maintained in operative position at said working location.

15. A method as claimed in claim 13, wherein the weight measurement is effected with the workpiece element in the tank whereby the weight of the tank and workpiece element is measured together.

16. A method as claimed in claim 15, wherein the tank is emptied of fluid before the weight measurement is effected.

17. A method as claimed in claim 15, wherein the weight measurement is effected on the workpiece element while the latter is immersed in the fluid in the tank.

18. An electrical discharge machine as claimed in claim 13, wherein the measuring of the weight of at least one of said workpiece and electrode elements takes place during the machining of the workpiece element.

19. An electrical discharge machine as claimed in claim 13 wherein the machining is halted when the weight of at least one of said elements is weighed.

* * * * *